United States Patent [19]
Loire et al.

[11] 4,135,467
[45] Jan. 23, 1979

[54] MEANS OF PROTECTION AGAINST THE SHOCKS OF SHIPS COMING ALONGSIDE, PARTICULARLY FOR PLATFORMS OF THE OFF-SHORE TYPE

[75] Inventors: René Loire, Paris; Daniel Guillaume, Rueil-Malmaison, both of France

[73] Assignee: Entreprise d'Equipements Mecaniques et Hydrauliques E.M.H., Boulogne, France

[21] Appl. No.: 791,686

[22] Filed: Apr. 28, 1977

[30] Foreign Application Priority Data

Apr. 30, 1976 [FR] France .............................. 76 12954
Apr. 19, 1977 [FR] France .............................. 77 11711

[51] Int. Cl.² ...................... B63B 21/04; B63B 21/00
[52] U.S. Cl. ............................... 114/219; 114/230; 405/212
[58] Field of Search ............... 114/264, 267, 258–263, 114/219, 220, 230, 231; 61/48, 49; 9/8 P

[56] References Cited
U.S. PATENT DOCUMENTS

| 2,039,151 | 4/1936 | DuBois | 114/219 |
| 3,212,271 | 10/1965 | Tibbetts | 114/219 |
| 3,406,523 | 10/1968 | Baker | 114/219 |
| 3,426,542 | 2/1969 | Hindman | 114/219 |
| 3,630,035 | 12/1971 | Wanneroy | 114/219 |
| 3,695,209 | 10/1972 | Giese | 114/230 |

Primary Examiner—Trygve M. Blix
Assistant Examiner—D. W. Keen
Attorney, Agent, or Firm—Larson, Taylor & Hinds

[57] ABSTRACT

The invention relates to means of protection against the shocks of ships coming alongside, particularly for platforms of the off-shore type.

Particularly in said platforms, where the height h of the deck above the level of the water is fairly large, the piles must be protected against the impact of ships or other obstacles which are drifting. For this purpose, according to the invention, are provided, mounted on the deck, or brackets integral therewith, protection means having possibilities of deformation and extending from the deck to the level of the water. Different embodiments of these protection means are indicated in the application. A net is provided for the impact of obstacles normally arriving on the corresponding side of the platform.

Application: oil-rig platforms.

15 Claims, 12 Drawing Figures

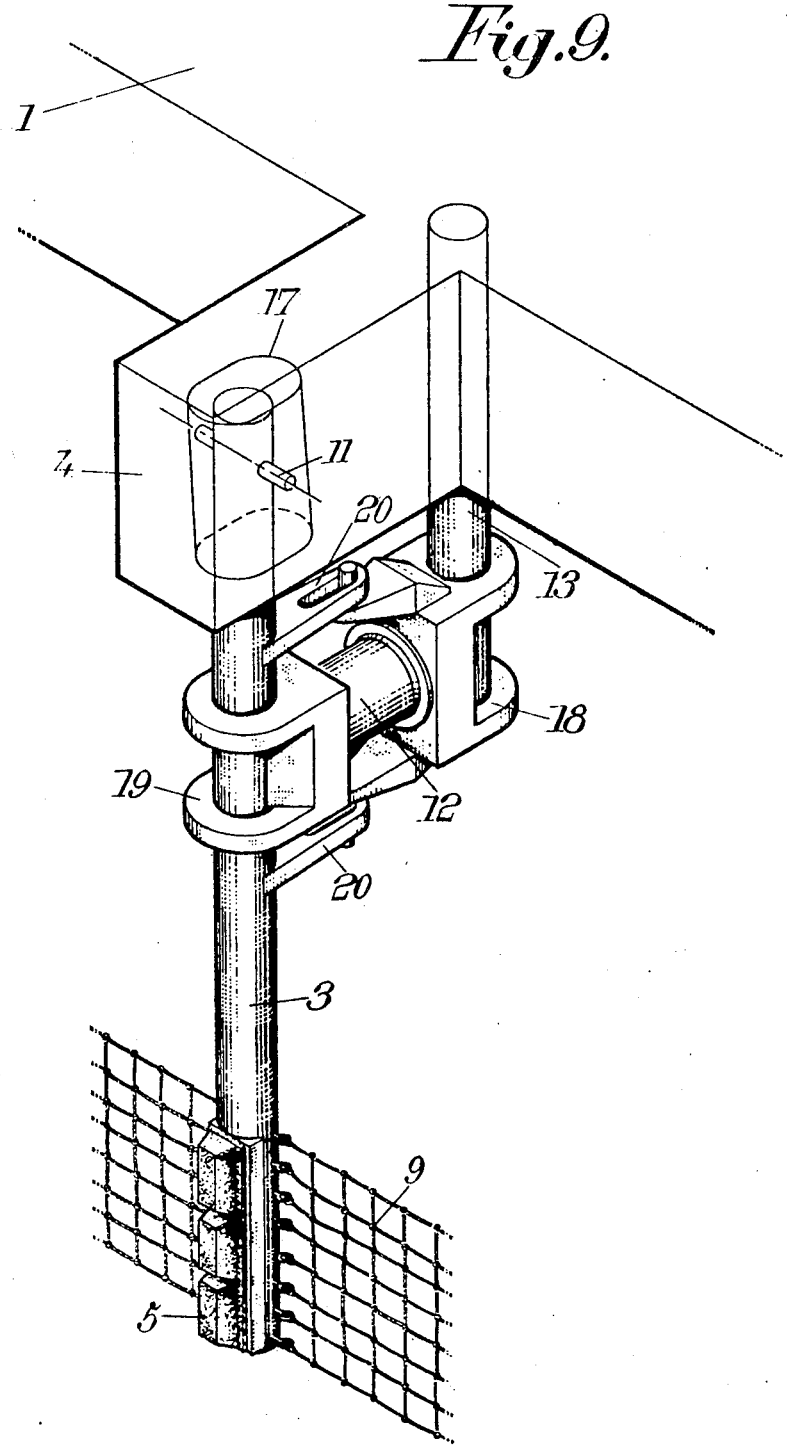

MEANS OF PROTECTION AGAINST THE SHOCKS OF SHIPS COMING ALONGSIDE, PARTICULARLY FOR PLATFORMS OF THE OFF-SHORE TYPE

The invention relates to means for protecting against the impact of ships coming alongside, more particularly for platforms such as those used in the search for oil or similar, at sea (or on other liquid levels), and which have possibly a deck situated at a certain height above the water-level and supported by a structure consisting generally of one or more submerged piles, with a suitable anchoring system which often consists in connecting the piles at their base to the sea-bottom either fixedly or possibly with hinges.

For such a platform it seems necessary that it be protected against the possible impact of obstacles — such as supply ships — liable to drift for an accidental reason such as an engine failure, a false manoeuvre etc. In fact, because of the distance, i.e. the head-room, between the deck and the water-level, which is fairly great being about 20 to 25 m to let the heaviest swells pass, this impact would take place not against the deck but against the structural piles, which could have catastrophic consequences for the survival of the platform.

In order to remedy this serious disadvantage there is provided in accordance with the present invention means for protecting against impacts which are suspended from the deck, between it and the liquid level, on the outside of the piles and at a suitable distance therefrom, said means having deformation possibilities such that they can receive shocks without danger to the piles.

In one advantageous embodiment, said means are constituted by a number of metal tubes or rods mounted to the deck and extending downwards towards the liquid level, these tubes acting in a way like inverted mooring posts.

These tubes or other members can be rigidly fixed to the deck and can operate in case of impact by their deformability. They could also be hinged to the deck and cooperate with hydraulic, pneumatic, resilient cushion or other shock absorbing means, operable when said tubes pivot. The tubes or other shock-absorbing members will be advantageously covered with rubber shock-absorbing cushions at the points of impact.

The invention comprises, apart from these arrangements, certain other arrangements which are preferably used at the same time and which will be explicitly described hereafter, particularly a second arrangement - generally relating to means of the kind in question having deformable elements or units carried at their base by the structure to be protected - which consists in arranging them so that they maintain a good deformability, even when the sea-level, through the effect of the tides, approaches said base, so that the impact of ships or similar also come close thereto, said elements having particularly one part, shaped like a trombone or similar, whose deformability, for liquid levels nearest the base, is added to the deformability of the main element.

It concerns more particularly certain modes of application, as well as certain embodiments of said arrangements; and it concerns more particularly still, and as novel industrial products, platforms of the kind in question having applied thereto these same arrangements, as well as the elements necessary for their emodiment and the installations comprising such platforms.

And it will be, in any case, well understood from the following complement of description and from the accompanying drawings, which complement and drawings are of course given solely as an illustration.

FIGS. 1 and 2 of these drawings show respectively elevational and top views, partly cut-away, of a platform for oil operations or similar, at sea, this platform being provided with impact absorbing means in accordance with the invention.

FIG. 9 shows a perspective view of a more concrete embodiment of the unit of FIG. 8.

According to the invention, and more especially according to that one of its modes of application as well as according to those of its embodiments of its different parts to which it seems preference should be given, providing for example a platform for oil operations at sea, which comprises essentially a deck 1 mounted on the upper part of piles 2 anchored on the sea-bed, and proposing to protect this platform against the impact of ships or other obstacles likely to drift, the following or similar is the way to operate.

For the sake of clarity, we will suppose for example that it is a question of a platform whose deck 1 is quadrangular in shape, with sides having a length of about 100 m and which is mounted on four piles 2 in the form of hollow columns of a diameter of about 6.5 m, this being only an example.

After assembly, deck 1 is generally at a height h above the water-level of about 20 to 25 m, so that a ship or other obstacle coming alongside would come into direct contact with the piles.

To protect the piles against these shocks, there is provided, in conformity with the invention shock energy absorbing means formed by protecting members which are suspended from the deck, therebelow, so that they extend for example in a substantially vertical direction as far as the level of the water, and even if necessary slightly below (or at least to low-water level), at a suitable distance d from the outside dimensional limit of piles 2 and these members are so arranged that they possess sufficient possibility of deformation, under the effect of impacts.

Thus, according to the embodiment shown in FIGS. 1 to 4, these members are constituted by metal tubes or rods 3 which are embedded at their upper end in the periphery of deck 1 of — in order to obtain a suitable distance d — in beams or brackets 4 integral with the deck.

As an example, such tubes will have a diameter of about 1.5 m.

Figure 3:
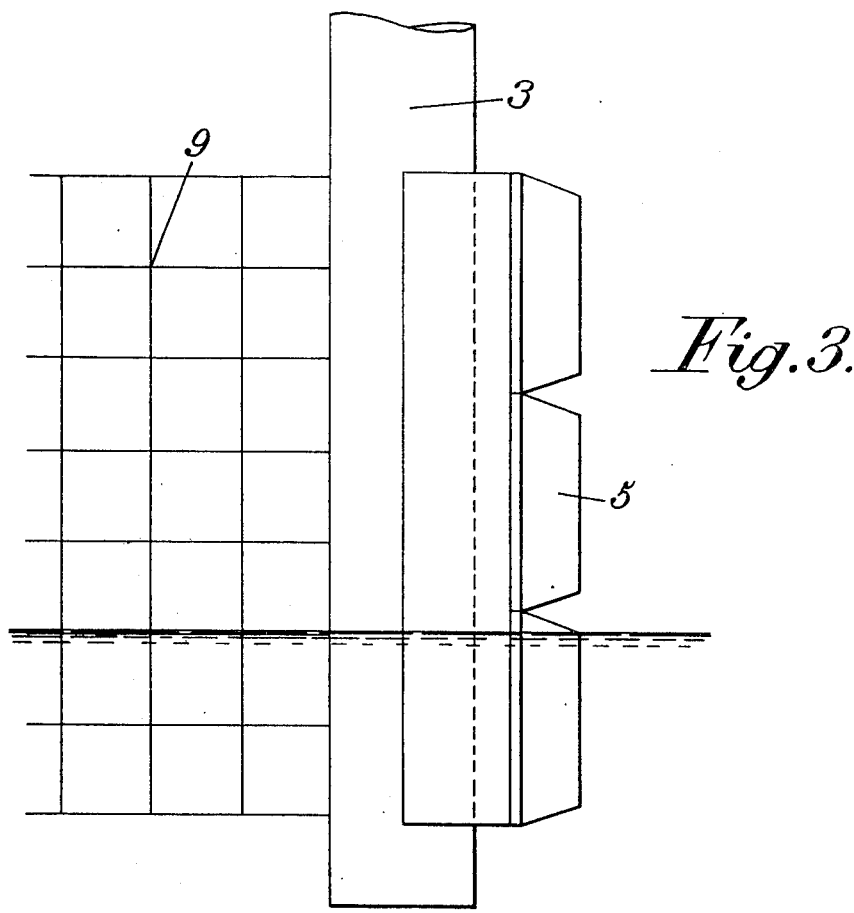
FIGS. 3 and 4 show respectively, on a larger scale, a side view and a horizontal section of a part of said means of the invention.
Figure 4:
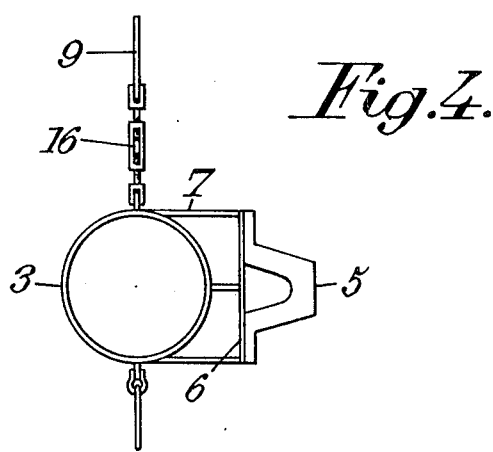

In their lower part, i.e. the part receiving the impact shocks, said tubes 3 are covered with a shock absorbing material 5, e.g. rubber cushions. FIGS. 3 and 4 show these cushions in more detail, being carried by a metal plate 6 connected to tube 3 by box-like elements 7 or in any other way.

Figure 1:
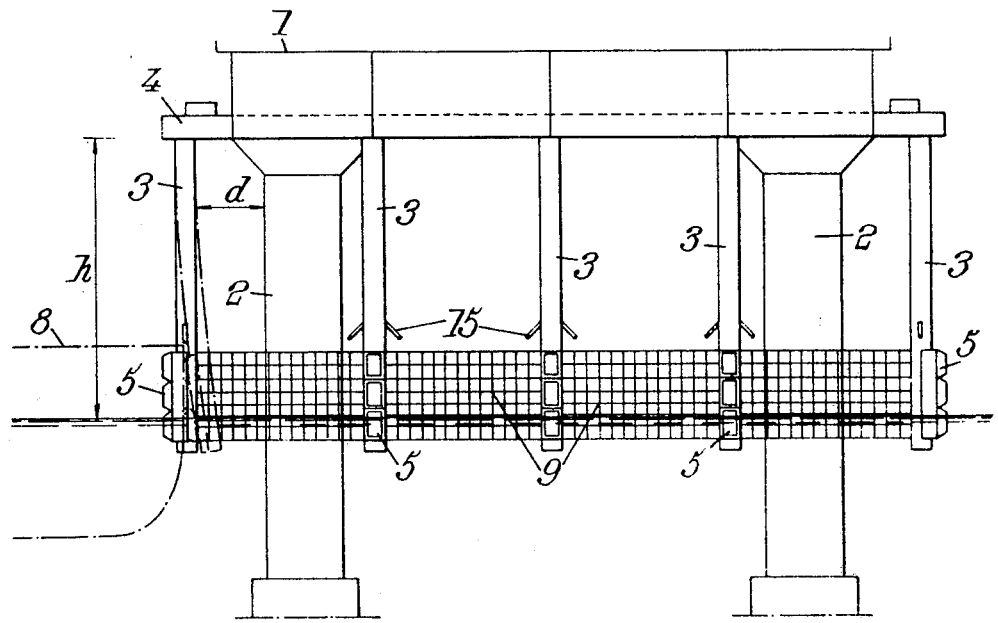
Figure 2:
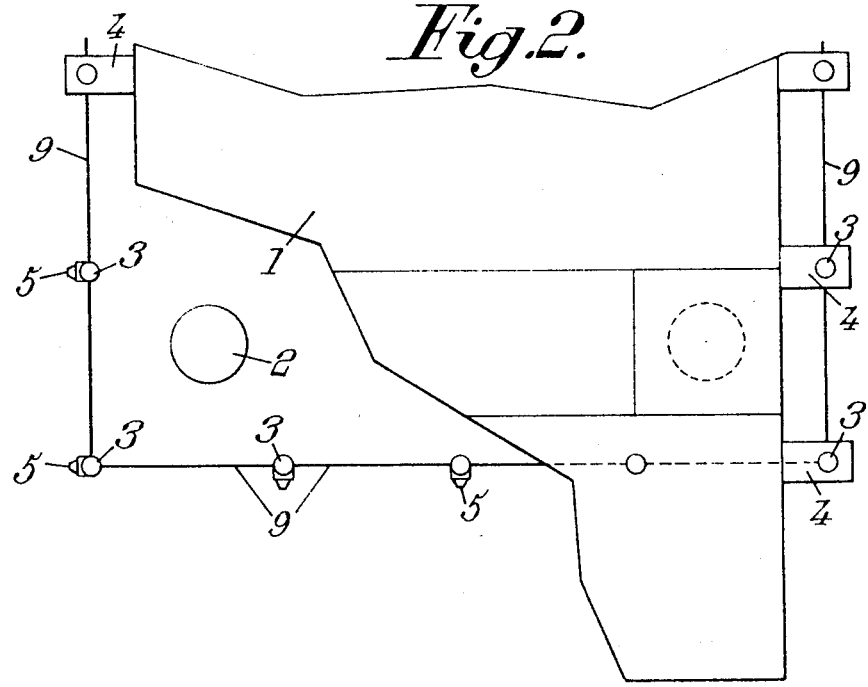

Such tubes can, by their deformation which is shown in dotted lines in FIG. 1, resist efficiently the impact of a ship or any other obstacle arriving sideways on.

But an obstacle arriving head-on, such as the ship shown at 8 in FIGS 1 to 5, could pass between two tubes 3 and come into contact with piles 2.

It is for receiving such shocks thet there is provided, between the different tubes 3, an additional obstacle formed by a suitable barrier, particularly:

by a rigid barrier enabling several flexible tubes 3 to be affected at the time of impact, or, as shown in FIGS 1 to 4, by a sort of metal or textile (nylon etc.) protecting net 9 connecting adjacent tubes and having a good deformability and so a natural capacity for absorbing kinetic energy.

The tensioning of these nets can be obtained in any suitable way, by means of tighteners such as can be seen at 16 in FIG. 4.

Figure 5:
FIG. 5 shows a diagrammatic top view of the deformation of a protection net, under the effect of an impact, according to the invention.

Thus there is provided an assembly which can resist the impact of all ships or obstacles, this impact being absorbed, according to the shape or dirction of the obstacle:

either directly by one of tubes 3 receiving directly the impact, the capacity of absorption of the energy depending on the free height h and the inertia of the tube, taking into account moreover the presence of the rubber shock absorbers 5, or by mens of the barrier or net 9, in which case there comes into play at the same time, as shown diagrammatically in FIG. 5, the resistance of the barrier 9 and the deformation by bending of two adjacent tubes 3.

Thus can be attained a capacity of absorption of the energy of impact which will be about 50 to 100 tons/-meter, if the impact takes place on a tube, and reaching 300 to 400 t/m if the impact takes place on the net.

The above embodiment with substantially rectilinear tubes 3 plunging into the sea is given only as an example and numerous variations can be imagined.

Figure 6:
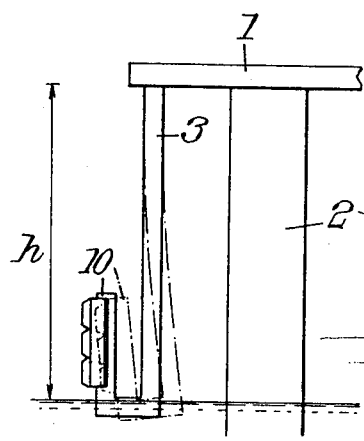
FIG. 6 shows diagrammatically another embodiment of the shock-absorbing means of the invention.

Thus, for certain uses, in particular for platforms whose head-room h is relatively low and also in the case where there exists a large difference between high and low tide and where the configuration, with ships or obstacles in the loaded condition, would make them apply their thrust at a high level above the water, the energy absorption capacity of the flexible tubes can be increased by giving them a curved shape in their lower part, i.e. a hook shape 10 or similar, such as shown in the embodiment of FIG. 6.

With such a system, in the case of an impact at the lower part of the tube, as shown in this FIG. 6 the energy absorbed would depend essentially on the flexibility of the main tube 3, as shown in dotted lines in said FIG. 6.

Figure 7:
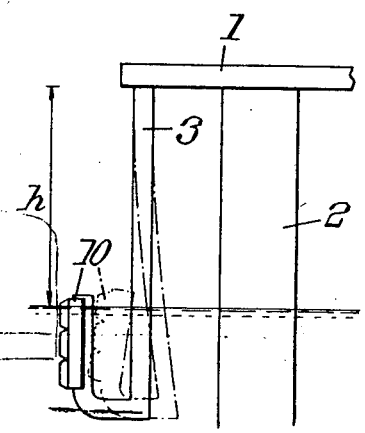
FIG. 7 shows one of the possible deformations, under the effect of a shock, of the device of FIG. 6.

In the case, on the contrary, where the impact takes place at the upper end of the hook-shaped part 10, the energy absorbed will depend both on the flexibility of this hook and on that of the main tube 3, as seen in FIG. 7.

Figure 11:
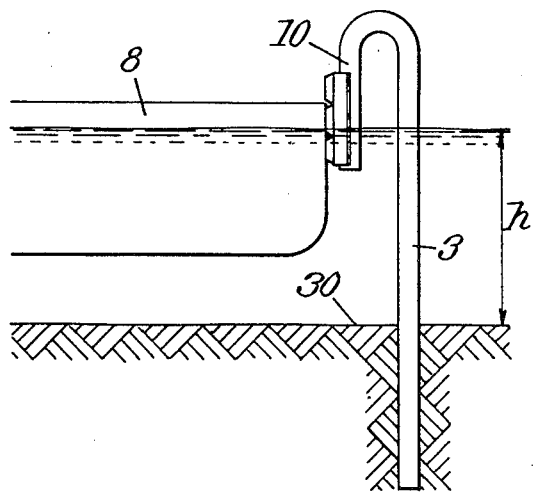
FIGS. 11 and 12 show for different shock-absorbing the unit formed by the sea-bed and the shock-absorbin means of the invention according to another application.
Figure 12:
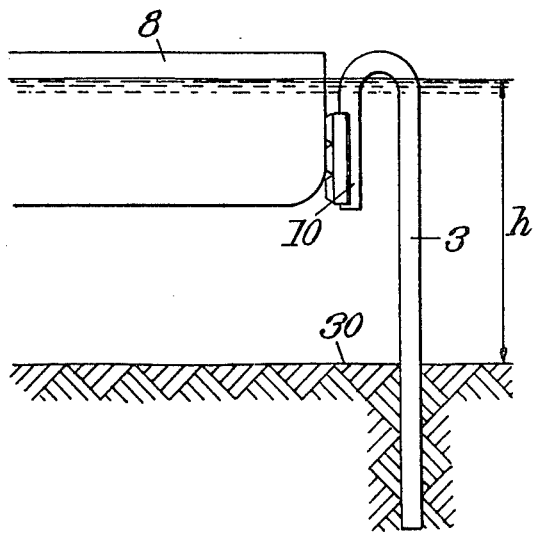

It is moreover to be noted that the arrangement of such shock-absorbers, maintaining their possibilities of deformation despite the variation of sea-level because of tides, would be generally applicable, within the scope of the invention, even to units other than platforms. Thus, as shown diagrammatically in FIGS. 11 and 12, they could be used generally as mooring posts 3, of a current type, either fixed to the sea-bed or similar 30, or fixed to the quay of a port installation or similar. Such devices 3 would then be provided, according to the invention, with a hook 10 or other similar element able to bring to bear an additional deformability making good, at low-tide, the deformability of the main elements 3 because of the diminution of height h between bottom 30, i.e. the base of said element, and the liquid level.

According to another embodiment, relating particularly to the case where still higher energies would have to be withstood, of about 400 to 500 t/m for example, there can be provided, not tubes fixed to the upper part of deck 1 but tubes hinged thereto and combined with hydraulic, pneumatic or stacked rubber cushion shock-absorbing means.

Figure 8:
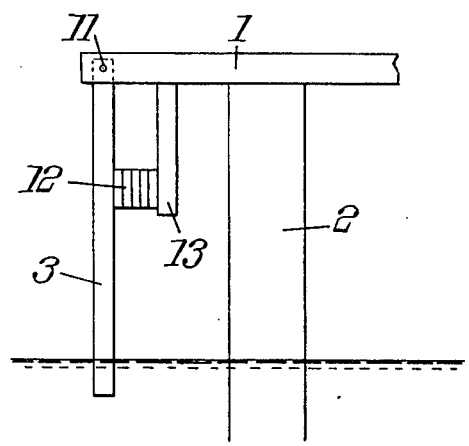
FIG. 8 shows a diagrammatical elevational view of another embodiment of the shock-absorbing absorbing means of the invention.

It is schematically shown in FIG. 8 that tubes 3 are hinged at 11 to deck 1 and that, on at least one intermediate point of tube 3, there acts a shock-absorbing device 12 located between said tube and a rigid or flexible supporting device, e.g. a tube 13 fixed to the deck.

FIG. 9 shows in perspective a more concrete embodiment of the diagram of FIG. 8. It can be seen that the head of tube 3 is mounted in a housing 17 of bracket 4 with a certain amount of play, spindle 11 being possibly gimballed or similar so that tube 3 can pivot in different directions. Shock-absorber 12 is mounted between two supports 18 and 19 rotatable about tubes 3 and 13, tube 3 being free to pivot according to whether it is acted upon from the front and/or the side. Additional guides can be provided at 20, between tubes 3 and 13.

It is to be noted that the supporting device 13 can be formed by several flexible elements (two for example), interlocked by a cross-member or shock-absorber distributing the stresses between them, or any other embodiment may be adopted.

Such a system allows therefore large displacements, and so a high energy absorption capacity, to be obtained at the upper part of tube 3.

The concerted action of the resilience proper to tubes 3 and 13 and that of shock-absorber 12, allows a wide range of displacement/absorbed energy response curves to be obtained. To this end the inertia of the tubes, the grades of steel used, the characteristics of the shock-absorber and its location may be varied.

The system of FIGS. 8 and 9 also allows tubes to be used whose relatively small diameters offer little resistance to the swell. Moreover, shock-absorber 12 is placed at a level such that the maximum swells will have no effect on it. Such elements can also be used in the application provided for in FIGS. 11 and 12.

Whereby, whatever the embodiment adopted, shock-absorption systems can be obtained whose operation is sufficiently clear from the preceding not to dwell further thereon and which present, in relation to the platforms known up to now, the principal advantage of ensuring a good protection against impacts.

Figure 10:
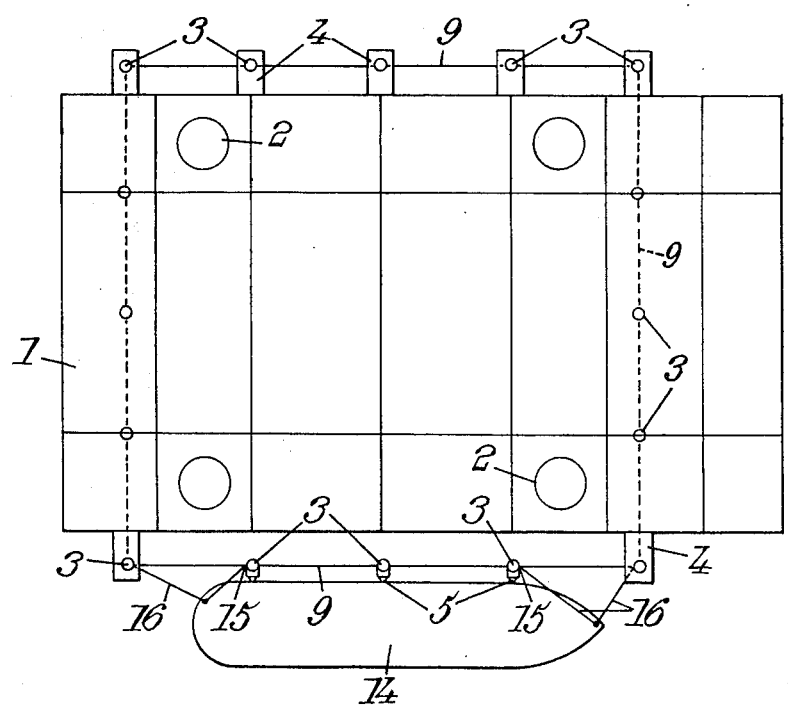
FIG. 10 shows a top view of the use of said shock-absorbing means for mooring a ship coming alongside the platform.

Moreover, an additional advantage resides in the fact that the systems conformable to the invention will allow service ships to be easily moored alongside, as shown in FIG. 10.

It can be seen in this FIG. 10 that such a ship, shown at 14, is tied up to different tubes 3 provided for this purpose with mooring devices such as 15 for fastening the cables 16 thereto.

It goes without saying, and as it follows moreover from what has gone before, that the invention is in no wise limited to those of its modes of application and embodiments which have been more especially considered; it covers, on the contrary, all variations thereof.

We claim:

1. A shock-absorbing system for protecting against impacts of obstacles such as ships and the like, structures such as platforms of the off-shore type wherein a deck is mounted at a predetermined height above the level of the sea on a support structure constituted by piles or the like, said system comprising deformable shock-absorbing elements suspended from the deck between the deck and a level at least substantially equal to a predetermined level of the sea, on the outside of the support piles and at a suitable distance therefrom, said shock-absorbing elements being arranged to form a row with each element being spaced apart from the others, said row of elements extending along the periphery of said platform, and barrier means, comprising a substantially vertically extending barrier surface, provided between adjacent ones of said elements taken two at a time and comprising a sheet-like element of substantial vertical extent, for preventing an obstacle, such as a ship arriving in a head-on path between said elements, from passing through said row of shock-absorbing elements and coming into contact with said support piles.

2. A system according to claim 1, characterised by the fact that said shock-absorbing elements comprise metal rods carried by the deck and extending downwards towards the level of the sea.

3. A system according to claim 2, characterised by the fact that, for each said rod, a said shock-absorbing device is pivotably connected to that rod and to at least one support carried by the deck, so that the said rod can move hingedly in different directions.

4. A system according to claim 3, characterised by the fact that extra guide means are provided between the tube and its support.

5. A system according to claim 1, characterised by the fact that said elements are hinged to the deck and cooperate with shock-absorbing devices located between said elements and other members integral with the deck.

6. A system according to claim 5, characterised by the fact that the shock-absorbing devices are formed by stacks of rubber.

7. A system according to claim 2, characterised by the fact that said elements are carried on brackets projecting outwardly from the deck.

8. A system according to claim 1, characterised by fact that said elements are disposed under the deck and act through their own deformability.

9. A system according to claim 1 and following, characterised by the fact that the shock-absorbing elements are covered, at their base, with rubber cushions for absorbing the shocks on impact with the obstacle coming in front of said means.

10. A shock-absorbing system according to claim 1, wherein said barrier means comprises a protective net connecting adjacent elements and having good kinetic energy-absorbing characteristics, said net extending from below said predetermined level of the sea to a substantial height thereabove.

11. A shock-absorbing system according to claim 1, wherein said system further comprises, for operation in zones where the sea level varies in height according to the tides, a supplementary deformable shock-absorbing means, said supplementary shock-absorbing means comprising a vertically extending shock receiving part which has a length adapted to the variations in height of the sea and which is spaced apart from said shock absorbing elements at a location so as to receive shocks at said vertical part, said supplementary shock-absorbing means being connected to the free ends of said shock absorbing elements opposite to the ends thereof secured to the support means thereof.

12. A shock-absorbing system according to claim 11, wherein said supplementary deformable shock-absorbing means are shaped so as to form a U-shaped configuration with the free end portions of said shock-absorbing elements to which they are connected.

13. A shock-absorbing system according to claim 11, wherein said vertically extending part of said supplementary shock-absorbing means includes rubber buffer means on the surface thereof for absorbing shocks.

14. A shock-absorbing system for protecting against the impact of obstacles such as ships or the like, units such as piers or platforms of the off-shore type, the decks of which units are mounted at a predetermined height above the water level, said system comprising a support structure; deformable, vertically extending shock-absorbing elements rigidly secured at one end thereof to said support structure; said system further comprising, for operation in zones where the level of the sea varies in height according to the tides, supplementary deformable shock-absorbing means including a vertically extending shock receiving part of a length in accordance with the level variations, said supplementary shock-absorbing means being spaced apart from said shock absorbing elements at a position for receiving the shocks at said vertical part thereof, and said supplementary means each being connected to the end of a corresponding one of said shock-absorbing elements opposite to the end of that element which is secured to said support structure.

15. A system according to claim 1, characterised by the fact that the absorbing means are provided with mooring devices for the mooring of a service ship or the like.

* * * * *